United States Patent
Veach

(10) Patent No.: US 7,668,748 B1
(45) Date of Patent: Feb. 23, 2010

(54) PRICING ACROSS KEYWORDS ASSOCIATED WITH ONE OR MORE ADVERTISEMENTS

(75) Inventor: Eric Veach, Mountain View, CA (US)

(73) Assignee: Google, Inc., Mountainview, CA (US)

( * ) Notice: Subject to any disclaimer, the term of this patent is extended or adjusted under 35 U.S.C. 154(b) by 1159 days.

(21) Appl. No.: 10/340,193

(22) Filed: Jan. 10, 2003

(51) Int. Cl.
*G06Q 30/00* (2006.01)
(52) U.S. Cl. .......................................... 705/14; 705/37
(58) Field of Classification Search ................. 715/517; 707/3; 705/14, 27, 37
See application file for complete search history.

(56) References Cited

U.S. PATENT DOCUMENTS

| | | | |
|---|---|---|---|
| 6,826,572 B2* | 11/2004 | Colace et al. | 707/10 |
| 6,907,566 B1* | 6/2005 | McElfresh et al. | 715/517 |
| 7,076,443 B1* | 7/2006 | Emens et al. | 705/14 |
| 7,225,151 B1 | 5/2007 | Konia | |
| 7,409,360 B1* | 8/2008 | Lark et al. | 705/26 |
| 2002/0169760 A1* | 11/2002 | Cheung et al. | 707/3 |
| 2003/0014331 A1* | 1/2003 | Simons | 705/27 |
| 2003/0055729 A1* | 3/2003 | Bezos et al. | 705/14 |
| 2003/0093285 A1 | 5/2003 | Colace et al. | |

OTHER PUBLICATIONS

"Company Press Release: Google's AdWords Program Offers Every Business a Fully Automated, Comprehensive and Quick Way to Start an Online Advertising Campaign," Google, posted online Oct. 23, 2000 (accessed from http://www.searchengineguide.com/pr/20001023_pr1.html).*
New Risks: "New Risks For High Debt Countries In EMU: Fitch IBCA Comments", PRNewswire, Jun. 4, 1998.*

* cited by examiner

*Primary Examiner*—Donald L Champagne
(74) *Attorney, Agent, or Firm*—Straub & Pokotylo; John C. Pokotylo

(57) ABSTRACT

Helping advertisers by simplifying the management of interactive advertising. Such simplification can be achieved by allowing an advertiser to specify a single bid for multiple keywords associated with an advertisement. When used in conjunction with a maximum cost bid, advertisers are not penalized with higher costs for such simplification.

15 Claims, 5 Drawing Sheets

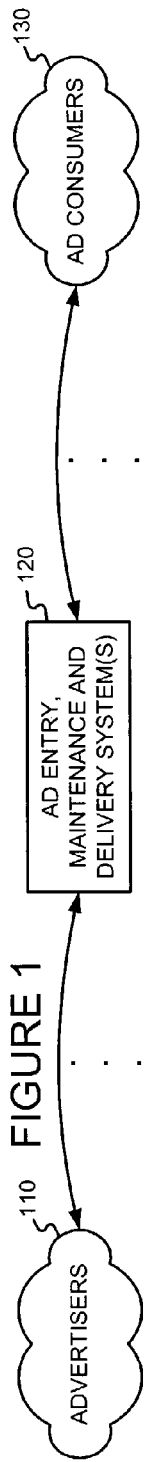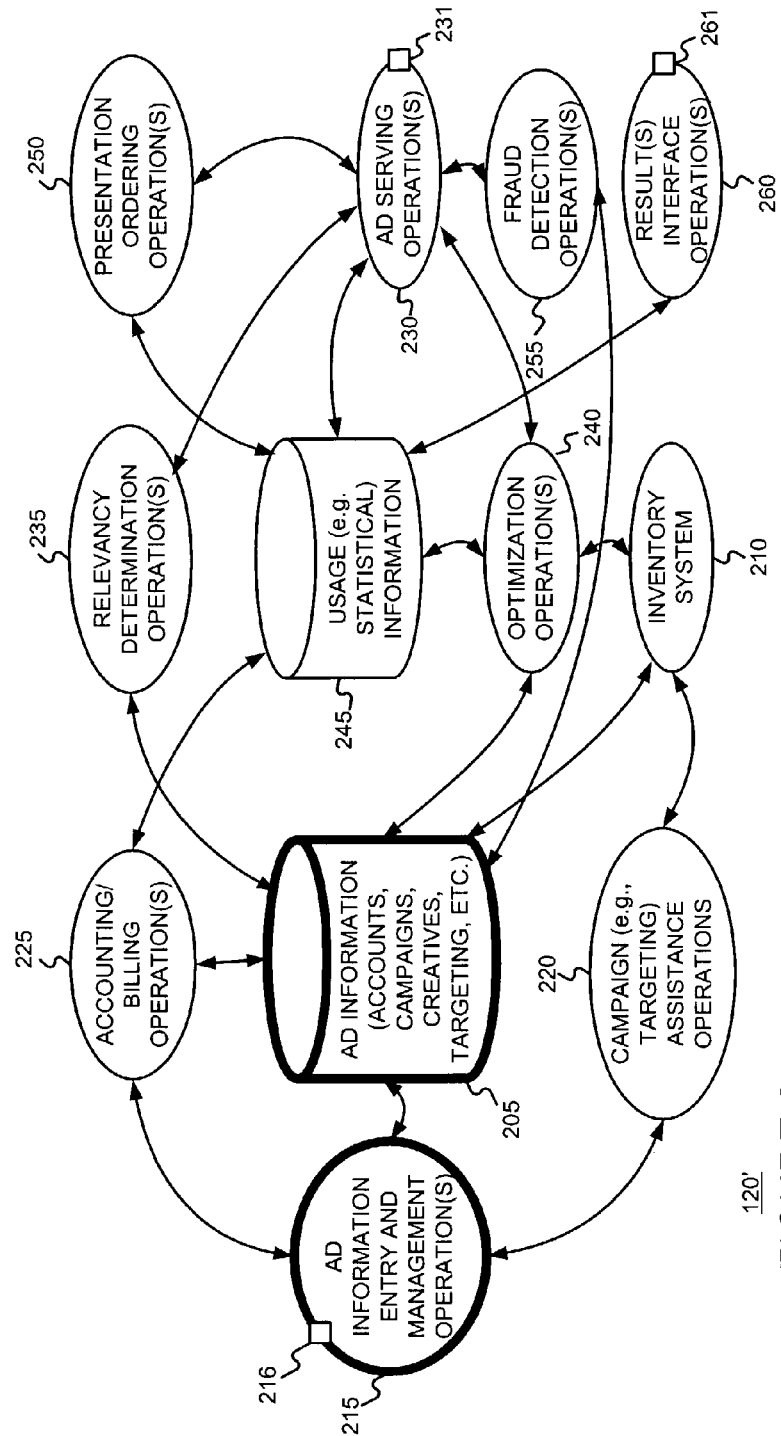

PRICING ACROSS KEYWORDS ASSOCIATED WITH ONE OR MORE ADVERTISEMENTS

1. BACKGROUND OF THE INVENTION

1.1 Field of the Invention

The present invention concerns advertising. In particular, the present invention concerns managing information associated with one or more advertisements to be served in an interactive advertising environment.

1.2 Related Art

Advertising using traditional media, such as television, radio, newspapers and magazines, is well known. Advertisers have used these types of media to reach a large audience with their advertisements ("ads"). To reach a more responsive audience, advertisers have used demographic studies. For example, advertisers may use broadcast events such as football games to advertise beer and action movies to a younger male audience. Similarly, advertisers may use magazines that reach a relatively affluent readership to advertise luxury items such as expensive watches and luxury automobiles. However, even with demographic studies and entirely reasonable assumptions about the typical audience of various media outlets, advertisers recognize that much of their ad budget is simply wasted. Unfortunately, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site.

Regardless of the strategy, Web site-based ads (also referred to as "Web ads") are typically presented to their advertising audience in the form "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Web site. This process, wherein the viewer selects an ad, is commonly referred to as a "click-through" (or more generally, "selection"). The ratio of the number of click-throughs to the number of impressions of the ad (i.e., the number of times an ad is displayed) is commonly referred to as the "click-through rate" of the ad.

Similarly, the hosts of Web sites on which the ads are presented (referred to as "Web site hosts" or "ad customers") have the challenge of maximizing ad revenue without impairing their users' experience. Some Web site hosts have chosen to place advertising revenues over the interests of users. One such Web site is "GoTo.com" (also known as "Accenture-.com"), which hosts a so-called "search engine" service returning purported "search results" in response to user queries. The GoTo.com web site permits advertisers to pay to position their Web site (or a target Web site) higher up on a list of purported search results by bidding on one or more keywords associated with the WebSite. When a search query has terms that match keywords previously bid upon, one or more WebSites associated with keywords having the highest bids are returned as purported search results. Aside from misleading end users with advertisements masquerading as search results, such as scheme is difficult from the perspective of an advertiser trying to manage bids on various keywords associated with their WebSite.

Accordingly, it is desired to permit advertisers to manage their online advertising without requiring them to specify a price for each keyword. Preferably, advertisers should not be penalized with higher costs for such simplicity.

2. SUMMARY OF TEH INVENTION

The present invention helps advertisers to manage their online advertising. It does so by associating two or more keywords with an advertisement, and associating a bid, collectively, with the two or more keywords.

3. BRIEF DESCRIPTION OF THE DRAWINGS

FIG. 1 is a high-level diagram showing parties or entities that can interact with an advertising system.

FIG. 2 is a bubble chart of an advertising environment in which, or with which, the present invention may operate.

4. DETAILED DESCRIPTION

Figure 3:
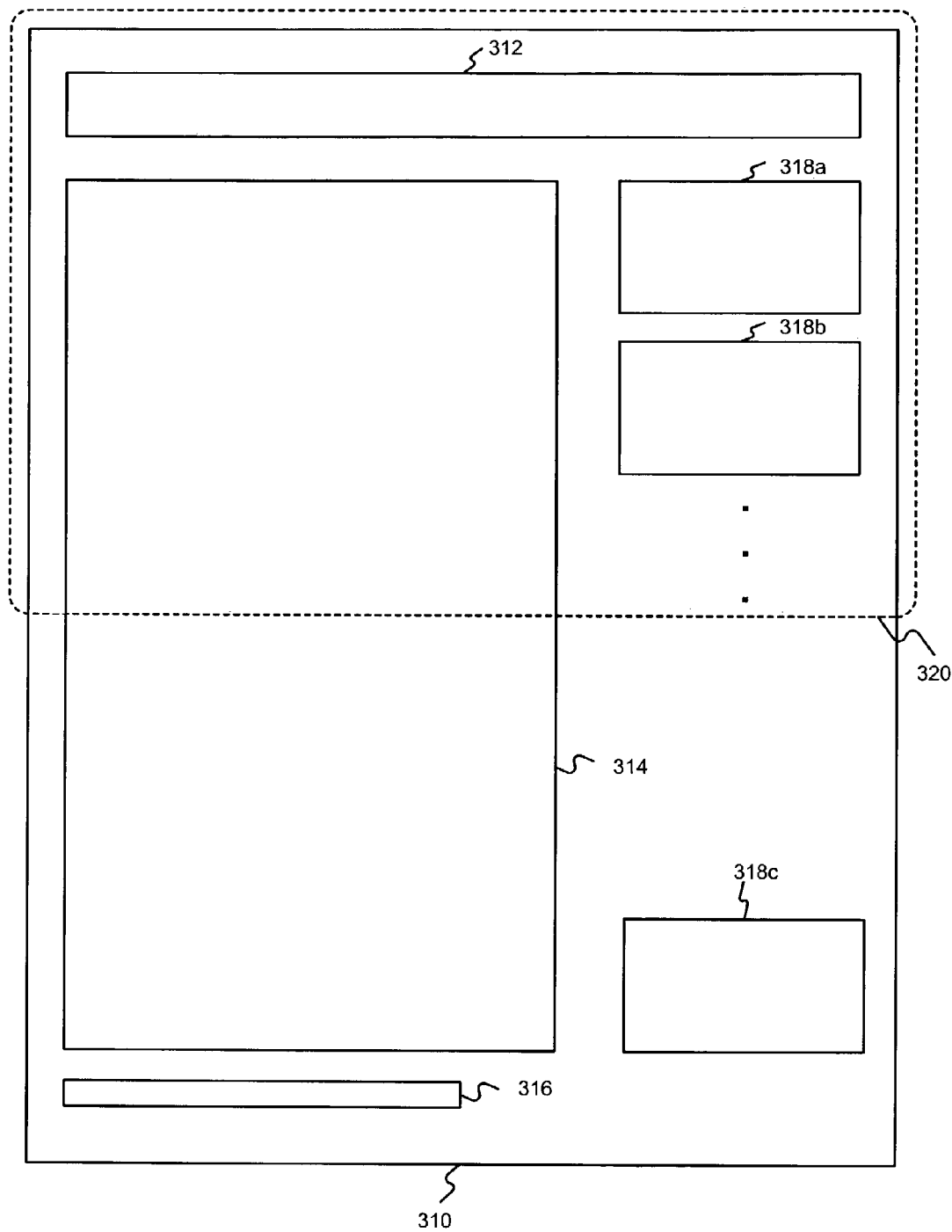
FIG. 3 is a block diagram of a Web page that may be generated by a page assembly operation of an ad consumer, for rendering on a viewer's screen.

The present invention may involve novel methods, apparatus, message formats and/or data structures for simplifying the management of advertising information. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention any patentable subject matter described below.

In the following, environments in which the present invention may operate are described in §4.1. Then, exemplary embodiments of the present invention are described in §4.2. Finally, some conclusions regarding the present invention are set forth in §4.3.

4.1 Environments in which, or with which, the Present Invention May Operate

4.1.1 Exemplary Advertising Environment

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, text-based ads, audio ads, video ads, ads combining various media types, etc. Ad consumers 130 may submit requests for ads to, accept ads responsive to their request from, and provide historical or usage information to, the system 120. Although not shown, other entities may provide historical or usage information (e.g., whether or not a conversion or click-through related to the ad occurred) to the system 120.

One example of ad consumer 130 is a general content server which receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., a page), a category corresponding to the content or the content request (e.g., arts, business, computers, arts-movies, arts-music, etc.) part of all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to that user. Finally, the content server may transmit information about the ads and how the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the articles S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

The search engine may combine the search results with one or more of the advertisements provided by the system 120. This combined information including the search results and advertisement(s) is then forwarded towards the user that requested the content, for presentation to the user. For example, FIG. 3 is an abstract illustration of a display page 310 that may be provided by the search engine. The outline 320 depicted with dashed lines corresponds to a portion of the display page 310 that may be viewed on a typical personal computer display screen at a typical resolution. The exemplary display page 310 may include header information 312 (e.g., the name of search engine host), trailer information 316 (e.g., copyright, navigational hypertext links, etc.), a plurality of search results 314 and a plurality of ads 318a, 318b, and 318c. The search results 314 are maintained as distinct from the ads 318, so as not to confuse the user between paid advertisements and presumably neutral search results. Although FIG. 3 shows only three ads 318, embodiments consistent with the principles of the present invention may have more or less ads. For example, ten search results combined with ten ads has been found to be effective.

Finally, the search engine may transmit information about the ad and/or how the ad was rendered, or to be rendered (e.g., position, click-through or not, impression time, impression date, size, conversion or not, etc.) back to the system 120. Alternatively, or in addition, such information may be provided back to the system 120 by some other means.

4.1.2 Exemplary Ad Entry, Maintenance and Delivery Environment

FIG. 2 illustrates an exemplary ad system 120' with which, or in which, the present invention may be used. The exemplary ad system 120' may include an inventory system 210 and may store ad information 205 and usage or historical (e.g., statistical) information 245. The exemplary system 120' may support ad information entry and management operation(s) 215, campaign (e.g., targeting) assistance operation(S) 220, accounting and billing operation(s) 225, ad serving operation(s) 230, relevancy determination operation(s) 235, optimization operations 240, presentation ordering operations 250, fraud detection operation(s) 255, and result(s) interface operation(s) 260. Advertisers 110 may interface with the system 120' via the ad information entry and management operation(s) 215 as indicated by interface 216. Ad consumers 130 may interface with the system 120' via the ad serving operation(s) 230 as indicated by interface 231. Ad consumers 130 or other entities (not shown) may also interface with the system 120' via results interface operation(s) 260 as indicated by interface 261.

The ad information 205 can be entered and managed via the ad information entry and management operation(s) 215. Campaign (e.g., targeting) assistance operation(s) 220 can be employed to help advertisers 110 generate effective ad campaigns. The campaign assistance operation(s) 220 can use information provided by the inventory system 210, which, in the context of advertising for use with a search engine, may track all possible ad impressions, ad impressions already reserved, and ad impressions available for given keywords. The ad serving operation(s) 230 may service requests for ads from ad consumers 130. The ad serving operation(s) 230 may use relevancy determination operation(s) 235 to determine candidate ads for a given request. The ad serving operation(s) 230 may then use optimization operation(s) 240 to select a final set of one or more of the candidate ads. That is, the relevancy determination operation(s) may be used to determine ads that may be served. The optimization operation(s) may then determine whether or not each of the candidate ads is, in fact, served. The ad serving operation(s) 230 may use presentation ordering operation(s) 250 to order the presentation of the ads to be returned. The fraud detection operation(s) 255 can be used to reduce fraudulent use of the advertising system (e.g., by advertisers), such as through the use of stolen credits cards. The result(s) interface operation(s) 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such result(s) information may be accepted at interface 261 and may include information to identify the ad and time the ad was served, as well as the associated result.

The principles of the present invention may be applied to the ad information entry and management operation(s) 215 and may affect how the ad information 205 is organized or inter-relationships among the ad information 205. More specifically, the principles of the present invention may be applied to simplify ad information entry and management.

4.2 Exemplary Embodiments 4.2.1 Exemplary Data Structures

Figure 4:
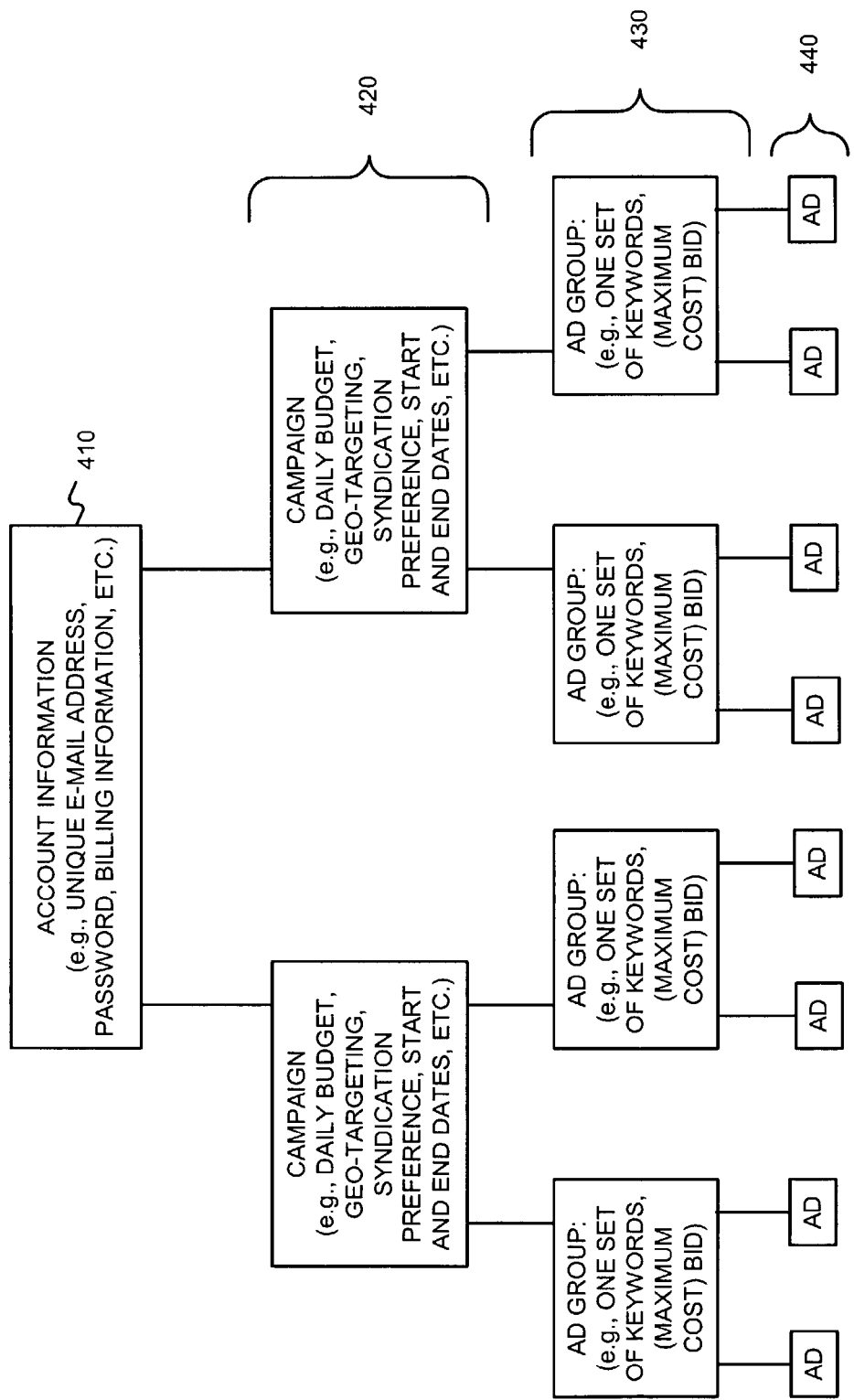
FIG. 4 is a block diagram illustrating an exemplary inter-relationship of advertising information that may be used by the present invention.

In one embodiment of the present invention, which may be used in the exemplary ad system 120', an advertising program includes information concerning accounts, campaigns, creatives, targeting, etc. FIG. 4 illustrates an exemplary inter-relationship 400 of advertising information, some of which information may be organized in a manner consistent with the principles of the present invention. As shown, account information 410 may include, for example, a unique e-mail address, a password, billing information (e.g., a billing address, a credit card, etc.), etc. Accordingly, the term "account" relates to information for a given advertiser.

Account information 410 may be associated with information 420 about one or more campaigns. Campaign information 420 may include, for example, one or more budgets for one or more time periods (e.g., a daily budget), geo-targeting information, syndication preference information, start and end dates of the campaign, etc. For example, Honda may have one advertising campaign for its automobile line, and a separate advertising campaign for its motorcycle line.

Each campaign may be associated with information 430 about one or more ad groups. Ad group information 430 may include, for example, keywords (which may be used by the relevancy determination operation(s) to decide whether or not to serve an ad), and cost information, such as a maximum cost bid for example.

Each ad group may be associated with information 440 about one or more ads. Ad information 440 may include, for example, content for the ad, a unique identifier, historical information about the ad or its performance, etc.

Figure 5:
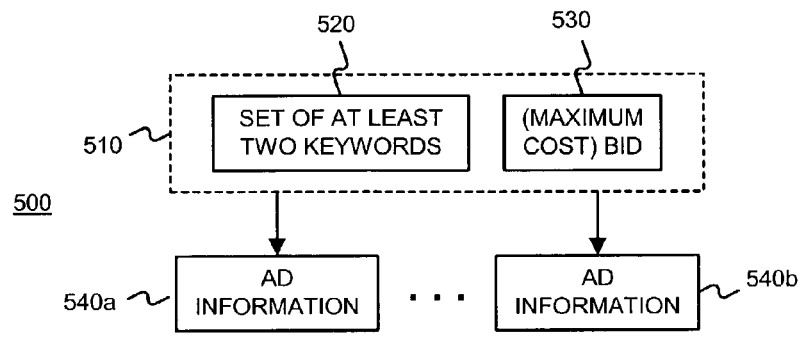
FIG. 5 is a block diagram illustrating an exemplary inter-relationship of ad, keyword, and bid information that may be used by the present invention.

Notice that under the exemplary inter-relationship 400 of advertising information depicted in FIG. 4, a single bid (e.g., a maximum cost bid) may be associated with one or more keywords, and both may be associated with one or more ads or ad identifiers. FIG. 5 illustrates such a relationship 500 more generally. Referring to FIG. 5 phantom, block 510 illustrates the association of a set of at least two keywords 520 with a bid (e.g., a maximum cost bid) 530. This associated information 510 may be associated with one or more ads or ad identifiers 540.

In the foregoing examples, keywords were introduced. In the exemplary system 200 of FIG. 2, the relevancy determination operation(s) 235 may use the keywords, together with information from an ad request, such as words or phrases from a search query for example, to determine relevant ads. In one embodiment, the relevancy determination operation(s) 235 may use different matching techniques: namely, "broad" matching, "phrase" matching, "extract" matching, and "negative" matching. If keywords for an ad are to be "broad-matched", the ad will be relevant for all search queries (or other ad request information) that include those keywords. For example, the keyword "tennis clothing" would broadly match the queries "tennis clothing sales", "clothing for tennis tournaments", etc. If keywords for an ad are to be "phrase-matched", the ad will not be relevant unless the search query (or other ad request information) are in the same order as specified by the keyword phrase. For example, the keyword phrase "tennis clothing" would phrase-match the query "red tennis clothing" but would not phrase-match the query "clothing for tennis tournaments". If the keywords for an ad are to be "exact-matched", the ad won't be relevant if the search query (or other ad request information) includes any words besides the exact keyword or phrase specified. For example, "tennis clothing" would not exact-match the query "tennis clothing sales". Finally, if keywords are to be "negative-matched", the ad wont't be relevant if the search query (or other ad request information) includes the negative key word. For example, if a keyword is "tennis" and a negative keyword is "racket", the ad would not be relevant if the search query (or other ad request information) was "tennis racket".

4.2.2 Exemplary Methods

Figure 6:
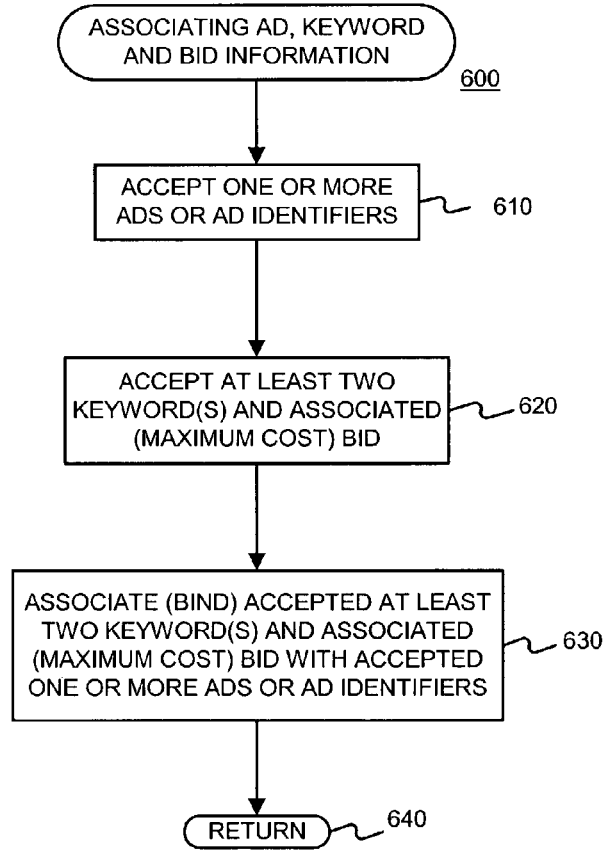
FIG. 6 is a flow diagram of an exemplary method that may be used to associate ad, keyword and bid information in a manner consistent with the principles of the present invention.

FIG. 6 is a flow diagram of an exemplary method 600 that may be used to associate ad, keyword and bit information in a manner consistent with the principles of the present invention. As shown, one or more ads or ad identifiers are accepted (block 610) (Recall, e.g., 540 of FIG. 5), and at least two keywords (Recall, e.g., 520 of FIG. 5.) and an associated bid (e.g., a maximum cost bid.) (Recall, e.g., 530 of FIG. 5.) are accepted (block 620). The accepted keywords and the associated (maximum cost) bid, and the accepted ad(s) or ad identifiers) are then associated (block 630) before the method 600 is left via RETURN node 640.

As stated above, the bid may be a maximum cost bid. Examples of maximum cost bids and their use in an interactive advertisement system are described in U.S. Provisional Application Ser. No. 60/424,792, filed on Nov. 8, 2002, entitled "AUTOMATED PRICE MAINTENANCE FOR USE WITH A SYSTEM IN WHICH ADVERTISEMENTS ARE RENDERED WITH RELATING PREFERENCE BASED ON PERFORMANCE INFORMATION AND PRICE INFORMATION" and listing Eric Veach as the inventor, and U.S. patent application Ser. Nos. 10/343,543 and 10/340,542, filed on Jan. 10, 2003, entitled "AUTOMATED PRICE MAINTENANCE FOR USE WITH A SYSTEM IN WHICH ADVERTISEMENTS ARE RENDERED WITH RELATIVE PREFERENCES" and "AUTOMATED PRICE MAINTENANCE FOR USE WITH A SYSTEM IN WHICH ADVERTISEMENTS ARE RENDERED WITH RELATIVE PREFERENCE BASED ON PERFORMANCE INFORMATION AND PRICE INFORMATION" and listing Eric Veach and Salar Arta Kamangar as inventors. (Each of those three applications are incorporated herein by reference.) The application of the principles of the present invention in a system using maximum cost bids advantageously offers simplicity without the trade-off potentially higher costs. For example, other advertising programs require advertisers to specify a price for each keyword. Consequently, advertisers not only spend more money than is necessary, but may also need to spend a significant amount of time monitoring their keywords in order to reduce costs. For example, if an advertiser bid a cost-per-click of $0.91 in order for its ad to appear in the top spot for a particular keyword, and the advertiser in the second position reduced its price from $0.90 to $0.70, the first advertiser would be paying $0.20 more than necessary to maintain its position. Using the principles of the present invention in a system in which maximum costs bids are used, an advertised needn't sacrifice cost for simplicity. More specifically, the advertiser can set the same maximum cost bid for all keywords with the assurance that it will be charged the lowest cost necessary to maintain the position of its ad for each keyword.

If an advertiser wants to assign different bids (e.g., maximum cost bids) to different keywords , it can simply set up different "ad groups" with different bids (e.g., maximum cost bids) amounts associated with different keywords, while having the various ad groups being associated with the same ad.

4.2.3 Exemplary Apparatus

Figure 7:
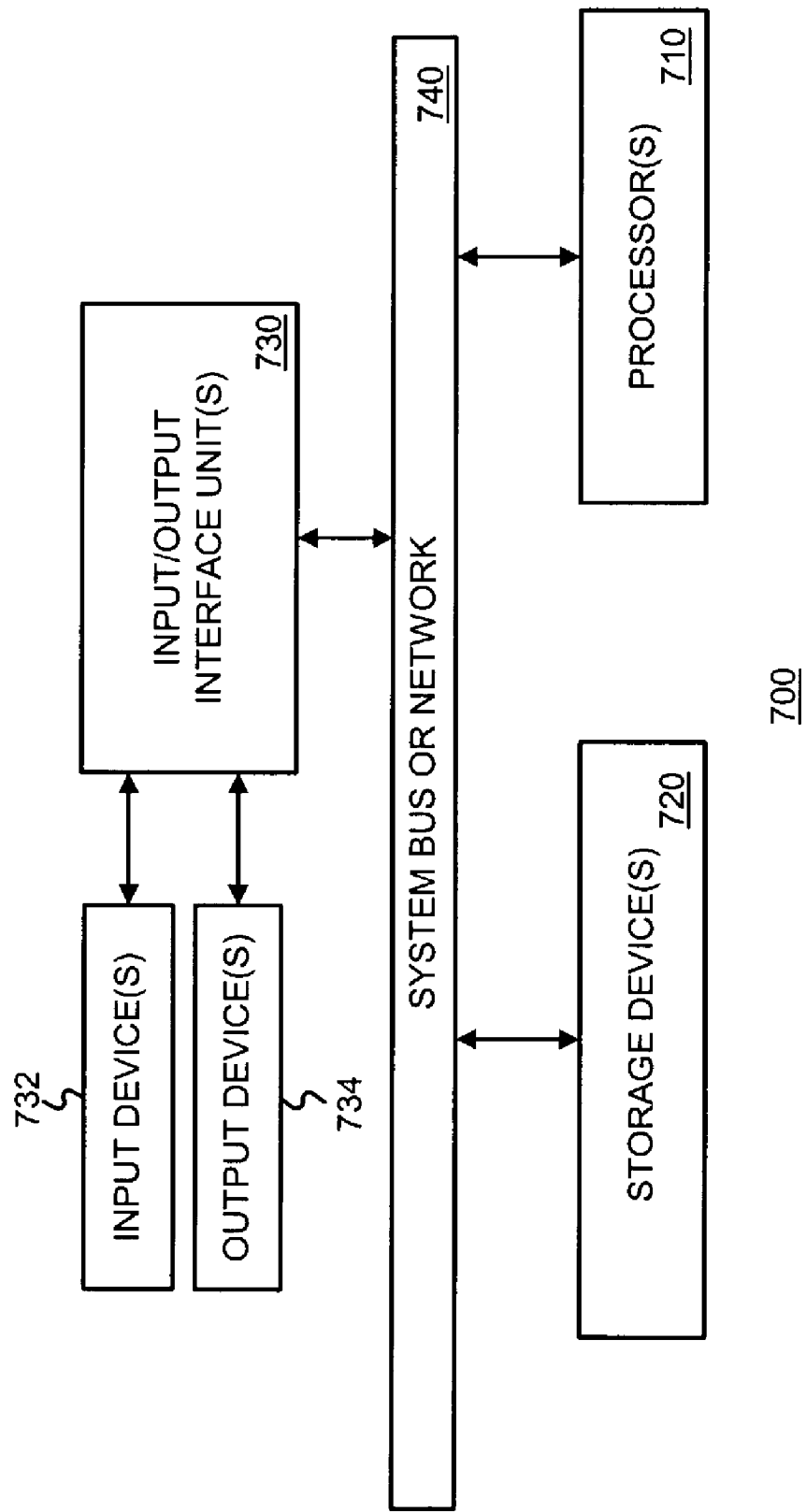
FIG. 7 is a high-level block diagram of apparatus that may be used to perform at least some of the various operations that may be performed consistent with the principles of the present invention.

FIG. 7 is a high-level block diagram of a machine 700 that may perform one or more of the operations discussed above. The machine 700 basically includes a processor(s) 710, an input/output interface unit(s) 730, a storage device(s) 720, and a system bus or network 740 for facilitating the communication of information among the coupled elements. An input device(s) 732 and an output device(s) 734 may be coupled with the input/output interface(s) 730.

The processor(s) 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the storage device(s) 720 and/or may be received from an external source via an input interface unit 730.

In one embodiment, the machine 700 may be one or more conventional personal computers. In this case, the processing units) 710 may be one or more microprocessors. The bus 740 may include a system bus. The storage devices 720 may include system memory, such a read only memory (ROM) and/or random access memory (RAM). The storage devices) 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing units (710) through an appropriate interface 730 coupled to the system bus 740.

The output device(s) 734 may include a monitor or other type of display device, which may also be connected to the system bus 740 via an appropriate interface. In addition (or instead of) the monitor, the personal computer may include other (peripheral) output devices (not shown), such as speakers and printers for example.

4.3 Conclusions

As can be appreciated from the foregoing disclosure, the present invention helps advertisers by simplifying the management of interactive-like advertisements. When used in conjunction with a maximum cost bid associated with a number of keywords, the present invention has the unique advantage of offering simplicity without the trade-off of potentially higher costs.

What is claimed is:

1. A computer-implemented method for associating environments, keywords, and bid information, the method comprising:
    a) accepting, with an ad system including one or more computers, one or more advertisements or information identifying the one or more advertisements;
    b) accepting, with the ad system, (1) at least two keywords input via an ad information entry interface and (2) a single maximum bid amount input via the ad information entry interface;
    c) storing, responsive to the accepted input specifying the single maximum bid amount, an association between the single maximum bid amount and each of the at least two keywords;
    d) storing, with the ad system, an association between (1) each of the at least two keywords and the single maximum bid amount and (2) the one or more advertisements or information identifying the one or more advertisements;
    e) receiving an ad request;
    f) determining, with the ad system, whether the one or more advertisements are relevant to the received ad request using each of the at least two keywords independently;
    g) determining, with the ad system, a first cost associated with serving the one or more advertisements responsive to a first query having a term matching a first of the at least two keywords associated with the single maximum bid amount; and
    h) determining, with the ad system, a second cost, which is different than the first cost, associated with serving the one or more advertisements responsive to a second query having a term matching another of the at least two keywords associated with the single maximum bid amount,
    wherein at least one of the first cost and the second cost is less than the single maximum bid amount associated with the at lest two keywords.

2. The computer-implemented method of claim 1 wherein the advertisement is a text-based advertisement.

3. The computer-implemented method of claim 1 wherein the single maximum bid amount is a maximum bid per impression and wherein the first and second costs are based on impressions of the one or more advertisements served.

4. The computer-implemented method of claim 1 wherein the single maximum bid amount is a maximum bid per selection and wherein the first and second costs are based on selections of the one or more advertisements served.

5. The computer-implemented method of claim 1 wherein the single maximum bid amount is a maximum bid per conversion and wherein the first and second costs are based on conversions of the one or more advertisements served.

6. The computer-implemented method of claim 1 wherein at least one of the at least two keywords is a broad match keyword.

7. The computer-implemented method of claim 1 wherein at least one of the at least two keywords is an exact match keyword.

8. The computer-implemented method of claim 1 wherein at least one of the at least two keywords is a phrase match keyword.

9. The computer-implemented method of claim 1 wherein at least one of the at least two keywords is a negative match keyword.

10. The computer-implemented method of claim 1 wherein a first of the at least two keywords is one of (A) a broad match keyword, (B) an exact match keyword, (C) a phrase match keyword, and (D) a negative match keyword, and wherein a second of the at least two keywords is a different one of (A) a broad match keyword, (B ) an exact match keyword, (C) a phrase match keyword, and (D) a negative match keyword, than the first of the at least two keywords.

11. The computer-implemented method of claim 1 wherein the advertisement is a graphical banner ad.

12. A computer-implemented method for associating advertisement, keywords, and bid information, the method comprising:
   a) accepting, with an ad system including one or more computers, at least two advertisements or information identifying the at least two advertisements;
   b) accepting, with the ad system, (1) at least two keywords input via an ad information entry interface and (2) a single maximum bid amount input via the ad information entry interface;
   c) storing, responsive to the accepted input specifying the single maximum bid amount, an association between the single maximum bid amount and each of the at least two keywords;
   d) storing, with the ad system, an association between (1) each of the at least two keywords and the single maximum bid amount and (2) the at least two advertisements or information identifying the at least two advertisements;
   e) receiving an ad request;
   f) determining, with the ad system, whether the at least two advertisements are relevant to the received ad request using each of the least two keywords independently;
   g) determining, with the ad system, a first cost associated with serving the at least two advertisements responsive to a first query having a term matching a first of the at least two keywords associated with the single maximum bid amount; and
   h) determining, with the ad system, a second cost, which is different than the first cost, associated with serving the at least two advertisements responsive to a second query having a term matching another of the at least two keywords associated with the single maximum bid amount, wherein at least one of the first cost and the second cost is less than the single maximum bid amount associated with the at least two keywords.

13. The computer-implemented method of claim 1, wherein the act of determining whether the one or more advertisements are relevant to the received ad request using each of the at least two keywords independently includes
   determining, with the ad system, whether or not the one or more advertisements are eligible candidate advertisements relevant to the received ad request, based on a match of a first one of the at least two keywords with the received ad request, independent of whether any other of the at least two keywords matches the received ad request.

14. The computer-implemented method of claim 13, the method further comprising:
   i) receiving a second ad request; and
   j) determining, with the ad system, whether or not the one or more advertisements are eligible candidate advertisements relevant to the received second ad request, based on a match of a second one of the at least two keywords with the received second ad request, independent of whether any other of the at least two keywords matches the received second ad request.

15. The computer-implemented method of claim 1, wherein the at least two keywords are input with separate entries via the ad information entry interface and the single maximum bid amount is input with a single entry via the ad information entry interface.

\* \* \* \* \*

UNITED STATES PATENT AND TRADEMARK OFFICE
CERTIFICATE OF CORRECTION

| | | |
|---|---|---|
| PATENT NO. | : 7,668,748 B1 | Page 1 of 1 |
| APPLICATION NO. | : 10/340193 | |
| DATED | : February 23, 2010 | |
| INVENTOR(S) | : Eric Veach | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1453 days.

Signed and Sealed this

Twenty-eighth Day of December, 2010

David J. Kappos
*Director of the United States Patent and Trademark Office*